(12) United States Patent
Crockett et al.

(10) Patent No.: US 7,502,455 B2
(45) Date of Patent: Mar. 10, 2009

(54) BILLING FOR TOLL FREE CALLS TERMINATING WITH A SECONDARY TELECOMMUNICATIONS CARRIER

(75) Inventors: Susanne Marie Crockett, Buffalo Grove, IL (US); Nancy Ann Book, Palatine, IL (US); Lucy L. Murphy, Mt. Prospect, IL (US); Robert B. Lasken, Schaumburg, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 913 days.

(21) Appl. No.: 11/024,780

(22) Filed: Dec. 30, 2004

(65) Prior Publication Data
US 2006/0056608 A1 Mar. 16, 2006

Related U.S. Application Data

(60) Provisional application No. 60/610,152, filed on Sep. 15, 2004.

(51) Int. Cl.
*H04M 15/00* (2006.01)
(52) U.S. Cl. ............................. 379/114.24; 379/114.28; 379/121.01
(58) Field of Classification Search ............ 379/114.01, 379/114.24, 114.28, 121.01, 121.05, 125, 379/126, 127.01, 219, 221.01, 221.02
See application file for complete search history.

(56) References Cited

U.S. PATENT DOCUMENTS

| 5,875,237 | A * | 2/1999 | Bolinger Jr. et al. ... 379/114.14 |
| 6,222,912 | B1 * | 4/2001 | Breuer .................. 379/114.24 |
| 2002/0136389 | A1 * | 9/2002 | Fleischer et al. ....... 379/221.08 |
| 2003/0235284 | A1 * | 12/2003 | Fleischer et al. ....... 379/221.01 |
| 2006/0062364 | A1 * | 3/2006 | Crockett et al. ........ 379/114.24 |

OTHER PUBLICATIONS

U.S. Appl. No. 10/975,343 to Book et al.

* cited by examiner

*Primary Examiner*—Binh K Tieu
(74) *Attorney, Agent, or Firm*—Greenblum & Bernstein, P.L.C.

(57) ABSTRACT

A telephone call is billed that originates in a primary carrier telecommunications network and terminates in a secondary telecommunications carrier network. The call is billed by generating multiple billing records in response to the telephone call, at least one billing record comprising a toll free number administered by the secondary carrier. It is determined whether the toll free number is administered by the secondary carrier; and the billing record including the toll free number administered by the secondary carrier is discarded when it is determined that the toll free number is administered by the secondary carrier. Thus, the primary carrier only bills for a portion of the call that was connected from the caller to the termination point of the primary carrier network.

21 Claims, 4 Drawing Sheets

BILLING FOR TOLL FREE CALLS TERMINATING WITH A SECONDARY TELECOMMUNICATIONS CARRIER

CROSS REFERENCE TO RELATED APPLICATIONS

This application claims priority of U.S. provisional patent application No. 60/610,152 to CROCKETT et al., filed on Sep. 15, 2004, the disclosure of which is expressly incorporated by reference herein in its entirety. This application is related to U.S. patent application Ser. No. 10/975,343 to BOOK et al., filed on Oct. 29, 2004, the disclosure of which is expressly incorporated by reference herein in its entirety

BACKGROUND OF THE INVENTION

1. Field of the Invention

This invention is directed to telecommunications, and more particularly, to billing toll-free telephone calls that are transferred to a secondary telecommunications carrier.

2. Background Information

When billing for a toll-free telephone number, the switching service point (SSP) handling the toll-free telephone call queries a switching control point (SCP) to determine where (i.e. which terminating telephone number) to route the toll-free telephone call. The SCP returns routing instructions to the SSP as to how the toll-free call is to be routed. The SSP then routes the telephone call to the telephone number indicated by the SCP. Upon the telephone call being answered at the terminating telephone number location, the SSP maintains information including the calling party telephone number, the terminating telephone number, how long the telephone call lasts, and the toll-free telephone number. This information is used when billing the toll-free telephone number holder for the charges incurred on their toll-free telephone number.

In some circumstances, the toll-free telephone call is transferred from the terminating telephone number to another toll-free telephone number, which may be administered by a secondary telecommunications carrier. When this occurs, billing by the secondary telecommunications carrier is also required. Thus, although multiple call detail records are created (one for each leg of the call), the primary telecommunications carrier need only bill for the portion of the call that was connected from the caller to the termination point over the primary carrier's network. The present invention is directed to solving one or more of the problems discussed above.

DETAILED DESCRIPTION

A method and system are provided for billing a toll-free telephone call corresponding to a first toll-free telephone number over a telephone network, the toll-free telephone call initiated by a calling party from an initiating telephone number. A first termination telephone number is determined for the first toll-free telephone number at an intelligent peripheral, and routed/looped through the intelligent peripheral to the first termination telephone number. The intelligent peripheral initiates a first billing/call record for the toll-free telephone call at the intelligent peripheral, and determines whether the toll-free telephone call is to be connected with a second toll-free telephone number. If it is determined that the toll-free telephone call is to be connected with a second toll-free telephone number, the intelligent peripheral determines a second termination telephone number for the second toll-free telephone number, and initiates a second call record where a connection with the second termination telephone number has been initiated. If the second toll-free number is administered by a secondary carrier, the second record may be discarded.

Having the system and method for billing toll-free telephone calls allows toll-free billing to multiple toll-free telephone numbers in the case of a transfer or conference between the calling party and additional toll-free telephone numbers during the toll-free telephone call, through the generation of call records for each toll-free number involved in the toll-free telephone call. Further, toll-free telephone billing may be accomplished without re-querying the service control point, or building a link with a national Service Management System (SMS) for routing instructions. In addition, service switching point call records are not needed for the toll-free telephone call billing, and the SNIP and/or SCP may provide more detailed billing capabilities than those generated by the SSP.

In addition, where the first termination telephone number subscribes to the billing service, the entire telephone call may be billed to a toll-free number other than the one corresponding to the toll-free telephone number corresponding to the first termination telephone number. For example, any interactive voice response unit time and feature counts (i.e., a count/tally of features that were utilized during a call such as authorization codes, announcements, etc.) may be billed as part of the first call record to the first toll free number, and any usage charges (i.e. talk time) from the initiating telephone number to the first termination as a second call record to a second toll free telephone number. The capabilities for billing to different toll-free telephone numbers during a telephone call is advantageous, especially where the toll-free telephone numbers are owned by different companies, as certain billing information often cannot be transferred from one company to another without a legal contract to do so. Moreover, when the different toll-free numbers are administered by different carriers, the billing record associated with the secondary carrier should be ignored by the primary carrier so that the primary carrier only charges for the portion of the call within the primary carrier's network.

In view of the above, the present invention through one or more of its various aspects and/or embodiments is presented to accomplish one or more objectives and advantages, such as those noted below.

According to an aspect of the present invention, a method is provided for billing a telephone call that originates in a primary telecommunications carrier network and terminates in a secondary telecommunications carrier network. The method includes generating multiple billing records in response to the telephone call, at least one billing record storing a toll free number administered by the secondary carrier. The method also includes determining whether the toll free number is administered by the secondary carrier; and discarding the billing record including the toll free number administered by the secondary carrier when it is determined that the toll free number is administered by the secondary carrier. Thus, the primary carrier only bills for a portion of the call that was connected from the caller to the termination point of the primary carrier network.

In one embodiment, the method also includes determining whether the telephone call is eligible to be connected to the secondary carrier. When the call is eligible to be connected to the secondary network, the call is routed to a LEC tandem that then routes the call to a final destination. A list of toll free numbers administered by the primary carrier may be checked. This list is stored in a service control point. When the toll free number in the billing record is not in the list, it is determined that the toll free number in the billing record is not administered by the primary carrier. In one embodiment, the billing record stores the terminating point and the call duration. Moreover, the call can be transferred to the second toll free number via a call transfer service.

In another aspect, a computer readable medium stores a program for billing a telephone call that originates in a primary telecommunications carrier network and terminates in a secondary telecommunications carrier network. The program includes a generating code segment that generates multiple billing records in response to the telephone call, at least one billing record storing a toll free number administered by the secondary carrier. The program also includes a determining code segment that determines whether the toll free number is administered by the secondary carrier; and a discarding code segment. The discarding code segment discards the billing record including the toll free number administered by the secondary carrier when it is determined that the toll free number is administered by the secondary carrier. Thus, the primary carrier only bills for a portion of the call that was connected from the caller to the termination point of the primary carrier network.

The program may also include a second determining code segment that determines whether the telephone call is eligible to be connected to the secondary carrier. In addition, a routing code segment may also be provided for routing the call to a LEC tandem that then routes the call to a final destination when the call is eligible to be connected to the secondary network.

In one embodiment, the determining code segment checks a list of toll free numbers administered by the primary carrier, the list being stored in a service control point. When the toll free number in the billing record is not in the list, the program determines that the toll free number in the billing record is not administered by the primary carrier.

In yet another aspect, an apparatus is provided for billing a telephone call that originates in a primary telecommunications carrier network and terminates in a secondary telecommunications carrier network. The apparatus includes a service control point (SCP) that generates multiple billing records in response to the telephone call, at least one billing record storing a toll free number administered by the secondary carrier. The SCP determines whether the toll free number is administered by the secondary carrier; and discards the billing record including the toll free number administered by the secondary carrier when it is determined that the toll free number is administered by the secondary carrier. Thus, the primary carrier only bills for a portion of the call that was connected from the caller to the termination point of the primary carrier network.

In one embodiment, the SCP further determines whether the telephone call is eligible to be connected to the secondary carrier. The SCP may also check a list of toll free numbers administered by the primary carrier, the list being stored in the service control point, to determine whether the toll free number in the billing record is administered by the primary carrier.

In still another aspect, a system is provided for billing a telephone call that originates in a primary telecommunications carrier network and terminates in a secondary telecommunications carrier network. The system includes a service node/intelligent peripheral (SNIP) and a service control point (SCP). The SNIP generates multiple billing records in response to the telephone call, at least one billing record storing a toll free number administered by the secondary carrier. The SCP receives the billing records from the SNIP and determines whether the toll free number is administered by the secondary carrier. The SCP also discards the billing record including the toll free number administered by the secondary carrier when it is determined that the toll free number is administered by the secondary carrier. Thus, the primary carrier only bills for a portion of the call that was connected from the caller to the termination point of the primary carrier network.

In one embodiment, the SCP further determines whether the telephone call is eligible to be connected to the secondary carrier. The SCP may also check a list of toll free numbers administered by the primary carrier (the list being stored in the service control point) to determine whether the toll free number in the billing record is administered by the primary carrier.

The various aspects and embodiments of the present invention are described in detail below.

Figure 1:
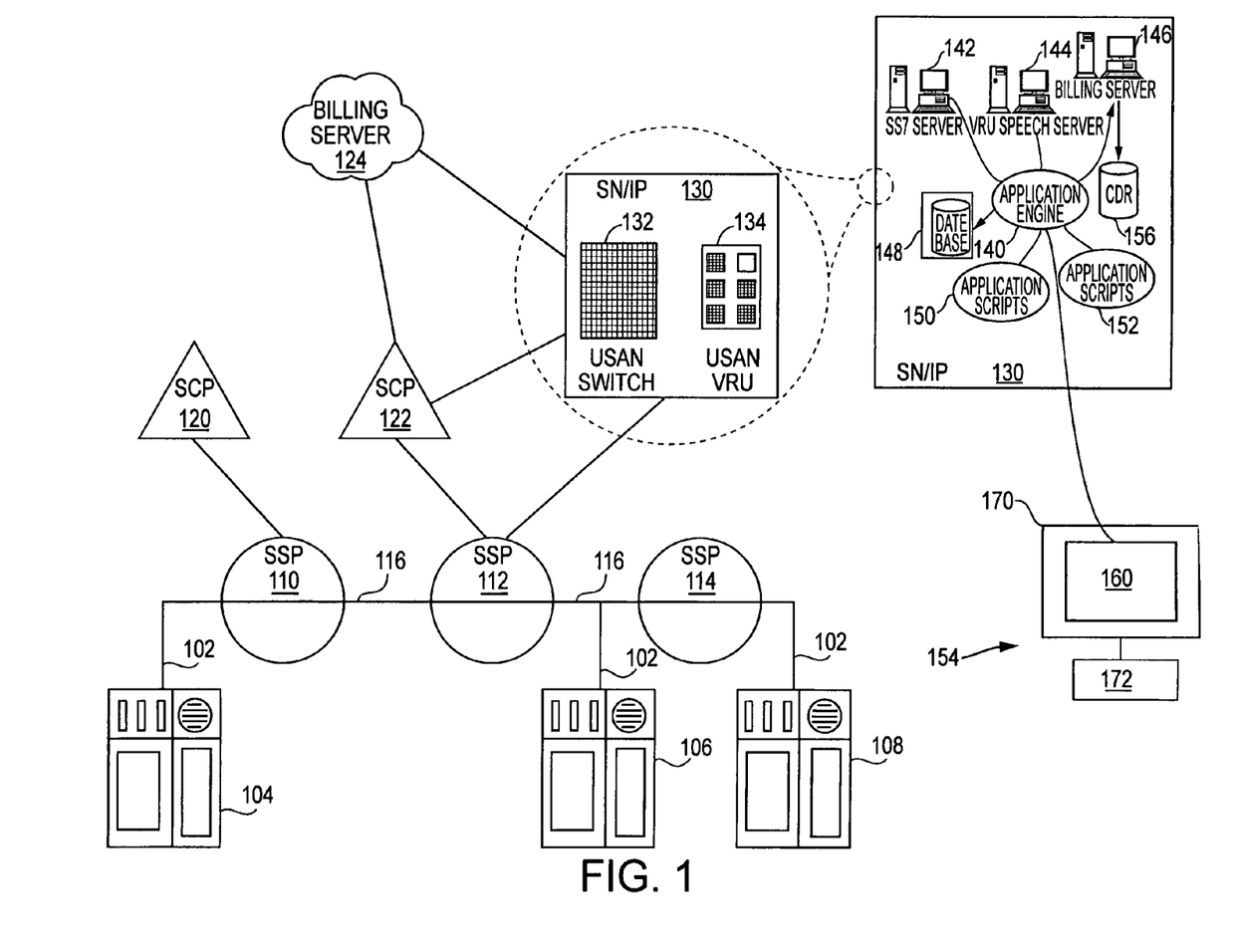
FIG. 1 is a block diagram of a telephone network for billing a toll-free telephone call, in accordance with an embodiment of the invention.

A block diagram of an exemplary telephone network 100 for billing a toll-free telephone call is shown in FIG. 1, in accordance with an embodiment of the invention. As shown in FIG. 1, a plurality of telephone lines 102 are shown, connecting a plurality of telephone network locations 104, 106 and 108 via service switching points (SSPs) 110, 112 and 114 respectively. The SSPs 110, 112 and 114 are connected via trunked communications lines 116, which are used to connect and carry communications signals, for example, voice and/or data, between two or more of the telephone network locations 104, 106 and 108.

Service control points (SCPs) 120 and 122 may be coupled with SSPs 110 and 112, respectively, and provide advanced intelligent network (AIN) capabilities to the telephone network, as well as routing information to the SSPs of the telephone network describing how a telephone call from a calling party to a called party is to be routed. It will be appreciated that one or more signal transfer points, not shown, may be provided to handle common channel signaling (i.e. using signaling system seven (SS7) communication messages) between the SSPs 110, 112 and 114, and the SCPs 120 and 122. The SS7 communications protocol is well-known, and is discussed in greater detail in U.S. Pat. No. 6,097,802 to Fleischer, III et al., assigned to SBC Technology Resource Group, Inc., and hereby incorporated by reference herein. A billing server is shown at 124, and may be coupled with one or more of the SCPs, for example, the SCP 122. The billing server 124 may be any billing server that is commonly known, that is capable of receiving billing information and providing the billing information to the long distance carrier for the generation of call records. For example, the billing server may be a billing server manufactured by Telegence System, having billing functionalities including, but not limited to, Audit and Control, Account Receivable, Billing Account Number, Bill Formatter, Customer Service Management, Enterprise Data Warehouse, Error Management System, End Of Day, Flexible Bill Formatter, General Ledger, Invoice Ready, Local Exchange carrier (LEC), LEC Formatting and Interface, Message Acquisition and Formatting, Message Processing System, Network Data Mover, Preferred Interexchange Carrier, Unauthorized, Update, and Telecom Business Solution.

A Service Node/intelligent Peripheral (SNIP) 130 may be coupled with an SSP, for example, the SSP 112, an SCP, for example, the SCP 122, and the billing server 124. The SNIP 130 may communicate with the SSP 112 using SS7 protocols, and the SNIP 130 may communicate with the SCP 122 and/or the billing server 124 using the file transfer communications protocol. Toll-free telephone calls may be routed/looped through the SNIP 130, for example, as described further below.

The SNIP 130 may include switching and interactive voice response unit (VRU) capabilities. For example, the SNIP may include a SNIP switch 132 (i.e. a SNIP SSP), capable of interfacing with an external SSP (i.e., the SSP 112) to receive incoming toll-free telephone calls from a calling party directed to the SNIP, and for routing the incoming telephone call through the SNIP 130 to the first terminating telephone number corresponding to the first toll-free telephone number. The SNIP 130 may further have capabilities for initiating transfer and/or conferencing of the incoming call with an additional telephone number(s). The SNIP switch 132 is coupled with an interactive voice response unit (VRU) 134 that provides voice response capabilities that may be used at the SNIP for performing conferencing or transferring of telephone calls from the first termination telephone number to an additional telephone number, for example, a second termination telephone number corresponding to a second toll-free telephone number. The VRU 134 may have capabilities, for example, for playing pre-recorded messages or performing text-to-speech reading of messages to a calling party, and for detecting signals within the telephone call indicating that a conference or transfer of the telephone call is desired. Such signals may include, for example, DTMF tones entered during the telephone call indicating a desire by one of the calling party or called party that a conference or transfer is desired. The conferencing or transferring of telephone calls by the SNIP 130 may be accomplished, for example, in a similar fashion as described with respect to the conferencing and/or transferring accomplished by the SNIP 130 in U.S. Provisional Patent Application No. 60/592,706, entitled "Subscriber Alterable Call Transfer Service," to Crockett et al., filed on Jul. 30, 2004, and hereby incorporated in its entirety by reference herein.

The switch 132 and VRU 134 may be implemented as shown in the expanded portion of FIG. 1, as an applications engine 140, coupled with SS7, VRU speech and Billing servers 142, 144 and 146, respectively. The application engine 140 may further be coupled with a memory device 148 (i.e. including one or more databases used in implementing the toll-free telephone call billing provided by the SNIP 130), and one or more applications scripts 150, 152. The application scripts 150, 152 may provide the programming used by the application engine 140 of the SNIP 130 in providing toll-free telephone call billing as described herein. The SNIP 130 may further be coupled with a SNIP host 154, typically comprising a display 170 and a controller such as a computer 172, that may be used to alter or add capabilities of the SNIP 130. The SNIP host 154 may communicate with the application engine 140, for example, via the Internet (not shown).

The application engine 140 may, for example, via the application scripts 150 and/or 152, provide functionality for monitoring a toll-free telephone call routed through the SNIP 130 to the first termination telephone number for a transfer or conferencing of the telephone call to a second terminating telephone number corresponding to a second toll-free telephone number. The application engine 140 may further provide functionality for maintaining billing information (i.e. initiating telephone number, first toll-free telephone number, first terminating telephone number, and a connection time between the initiating and first telephone numbers) for generating a first call record for the connection between the initiating telephone number and the first termination telephone number. In addition, the application engine 140 may provide functionality for maintaining billing information (i.e. initiating telephone number, second toll-free telephone number, second terminating telephone number, and a connection time between the initiating and second telephone numbers) for generating a second call record for the connection between the initiating telephone number and the second termination telephone number. Where desired, the application engine 140 may have capabilities for transferring one or more pieces of billing information to a SCP, for example, the SCP 122, where the SCP has capabilities for generating a first and second call record, as described below.

In the case when the second toll-free number is administered by a secondary telecommunications carrier, the second call record is discarded because the secondary carrier will bill for the second leg of the call. In order to accomplish the discard, the SCP 122 checks the second toll-free number against a list of toll free numbers administered by the primary carrier. If the number is not in the list, then the second record is discarded. The list can be stored internally in the SCP 122. The discard in the case of a USAN platform is in the SNIP 130 and in the case of a Alcatel platform will be done in the Billing Platform 124.

In one embodiment, the billing record is sent to the Billing Platform 124 so that the same record can be used internally to validate SSP charges, when the SSP is operated by another carrier. That is, even though the primary carrier does not bill the customer while holding up the call, the carrier of the SSP will charge the primary carrier.

The application engine 140 may comprise, for example, one or more controllers (not shown) capable of providing billing capabilities, the controller(s) operating under one or more application scripts 150, 152, providing programming for controlling operation of the application engine 140 in providing the billing capabilities described herein, or other services that may be provided at the SNIP 130. The SS7 server 142 has capabilities for parsing received SS7 messages, and for generating SS7 messages, for example, to communicate to the SSP 112 to indicate that a received telephone call from a calling party is to be placed on hold, transferred, conferenced or returned to a menu routing application. The VRU server 144 has capabilities for providing the VRU functionality discussed herein, such as for providing text-to-speech messages or pre-recorded messages to a calling party, and for receiving signals, such as DTMF tone sequences, indicating a desire for a conference or transfer of the telephone call placed over the first toll-free telephone number. The billing server 146 may, in conjunction with the application engine 140, handle the generation and storage of billing information for the SNIP 130, where the billing information may be stored in a memory device 156 such as Compact Disc Recordable device or the storage device 148 of the SNIP 130. The billing server 146 may further provide a communications interface between the SNIP, and the billing server 124. Although not shown, additional or alternative servers may be provided, where it is desirable to communicate with an SSP or other telephone network equipment external to the SNIP, for example, using AIN, Internet or other communication protocols.

As would be appreciated by one skilled in the art, each of the SS7, VRU and Billing servers 142, 144 and 146, respectively, may be implemented using separate controllers operating under separate programming, for example, provided from memory devices present within the respective servers. The servers 142, 144 and 146 are capable of communicating with the applications engine 140 under one or more communications protocols, as would be appreciated by one skilled in the art. In the alternative, the functionality provided by the servers 142, 144 and 146 may be implemented at the applications engine 140, through one or more controllers. Further, the applications engine has capabilities for communicating with the SNIP host 154, for example, using PPP, TCP/IP, or other known communication protocols, as would be appreciated by one skilled in the art.

The SNIP 130 discussed above may be implemented, for example, as a MRP Media Resource Point, available from Compagnie Financière Alcatel. Alternatively, the SNIP 130 can be implemented as a Readi800 topology, created and maintained by United States Advanced Networks. Such a topology may include, for example, a Readi800 Web Server having capabilities for communicating with the SNIP host 154, a Readi800 Application database and Tomcat Server having firewall capabilities to protect the SNIP 130 and telephone network 100 from unwelcome access and attacks from unauthorized users, Readi800 Call Processing Equipment, and Internet routing capabilities. The components of the SNIP 130 may be coupled, for example, by Ethernet connections, using Cat 5 cable, or by any other fashion allowing the various components within the SNIP 130 to communicate with one another.

Using the SNIP 130 described above, multiple call records may be generated during a telephone call that is transferred from a first toll-free telephone number to a second toll-free telephone number, without using the switch (SSP) generated call records. The SSP generated call records may be compared with those generated by the SNIP 130 to determine which SSP call records are duplicates, and thus may be discarded. The capability to provide multiple call records may be provided in conjunction with any toll-free telephone number. Alternatively, the capability may be provided as a service to a subscriber (i.e. the toll-free telephone number subscriber), e.g., to help recoup the extra costs of extended use of the ports of the SNIP 130 for the duration of the call.

In this case, an 8XX access table is checked. The 8XX access table stores a list of identifiers, such as a switch identifier and trunk group number, which identify each subscriber to the service, i.e., permitted to place toll free calls to a secondary carrier. An alias for each switch identifier/trunk group number can also be provided. The alias is preferably the corresponding NPA NXX. The look-up in the 8XX access database may be performed, in addition to the setting of the trigger in the switch, in case toll free calls are received via a call transfer service, rather than being dialed directly. If the switch identifier/trunk group number is not found, the subscriber is disconnected. If the switch identifier/trunk group number is found, the subscriber is permitted access.

To generate multiple call records for a toll-free telephone call from the initiating telephone number (i.e. network location 104) to the first termination (i.e., network location 106), the toll-free telephone call is routed/looped through the SNIP 130 to the first termination. The SNIP "listens in" on the telephone call to determine whether the telephone call to the terminating telephone number has been transferred to or conferenced with another toll-free telephone number, for example, corresponding to a second termination telephone number corresponding to network location 108. Where a transfer or conference is detected, the SNIP 130 is capable of generating a second call record for the transferred toll-free call to the new toll-free telephone number (i.e. a $2^{nd}$ termination telephone number). In the case of a call transfer, the first call record may be ended. In the case of a conference with the second termination, the first call record may continue, while the second call record is initiated. If the transfer is to a number administered by a secondary carrier, the second record will be discarded, as discussed above.

In order to transfer the call to a toll free number that is not administered by the primary carrier, an 8XX routing table is searched. The 8XX routing table maps NPA NXXs (corresponding to the switch identifier/trunk group number) to route indexes. Each route index indicates to which tandem switch, e.g., within a local exchange carrier (LEC) network, the toll free call should be routed.

If the NPA NXX is found in the 8XX routing table, then the associated route index is looked-up in a route table to determine an identifier, e.g., the switch identifier/trunk group number, of the destination tandem. If the route index is found the SCP 122 provides instructions to route the call to a switch outside the IXC network and then the IXC network's processing ends.

In one embodiment, if the call was received via a call transfer service, the SCP 122 instructs an intelligent peripheral 130 to route the call. If the call was received via direct dial, the SCP 122 instructs the switch 132 to route the call. Once the call is routed to the switch outside the IXC network, normal toll free processing for the outside switch then occurs, i.e., the outside switch queries the national SMS and routes the call in a well known manner. If the route index is not found, the call is disconnected.

If the NPA NXX is not found, an error is logged and it is determined whether a default route index has been provided. If so, the default route index is obtained and queried in the route table. The logic then proceeds as described above. If no default route is determined to be provisioned, the call is disconnected. In one embodiment, the SNIP 130 may itself generate the call records. In another embodiment, an SCP coupled with the SNIP may generate the call records. In the latter case, the SNIP may communicate with the SCP that the call has been transferred to, or conferenced with, another toll-free telephone number. The SNIP 130 may communicate various billing information to the SCP 122, including, for example, but not limited to, the initiating telephone number, the first and/or second toll-free telephone number(s), the first and/or second termination telephone number(s), and connection times between the initiating telephone number and the first and/or second termination telephone number(s). Where a transfer or conference is detected, the SCP 122 is capable of generating another call record for the transferred toll-free call to the new toll-free telephone number (i.e. a $2^{nd}$ termination telephone number). In the case of a call transfer, the first call record may be ended by the SCP 122. In the case of a conference with the second termination, the first call record may continue, while the second call record is initiated. If the transfer is to a number administered by a secondary carrier, the second record will be discarded, as discussed above.

Generation of call records by both the SNIP and the SCP are discussed in detail below.

Figure 2:
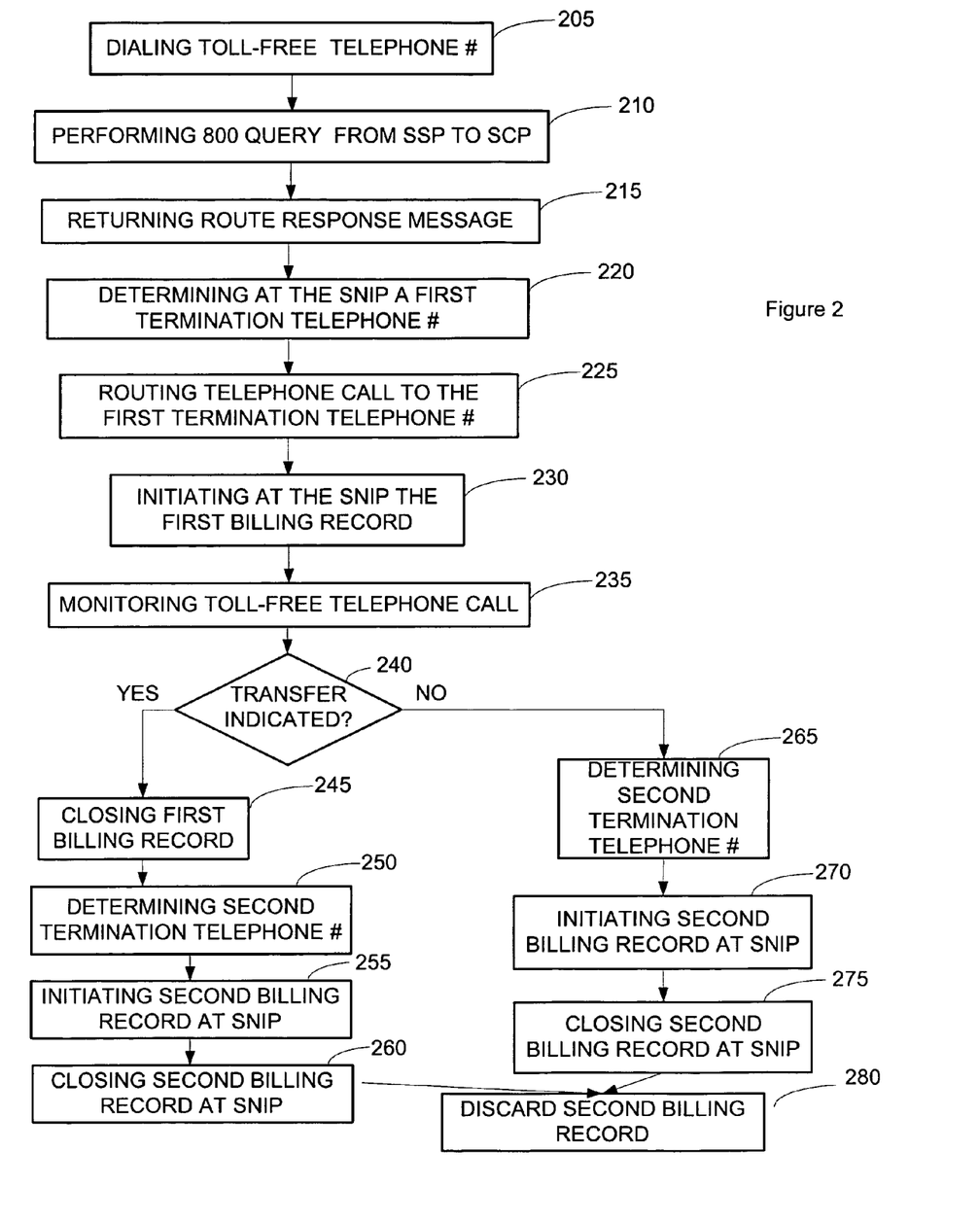
FIG. 2 is a flowchart illustrating operation of the telephone network of FIG. 1 in providing toll-free telephone call billing, where call records are generated by a Service Node/Intelligent Peripheral, in accordance with an embodiment of the invention.

FIG. 2 is a flow chart illustrating operation of the telephone network of FIG. 1 in billing a toll-free telephone call, in accordance with an embodiment of the invention. The flowchart of FIG. 2 will be discussed in relation to the telephone network 100 of FIG. 1, and will discuss billing a telephone call where the SNIP 130 has capabilities for generating call records for billing of the toll-free telephone call.

As shown at box 205, a calling party 104 dials a first toll-free telephone number. At box 210, the SSP 110 performs an 800 query with the SCP 122, for example, utilizing the SS7 communications protocol. At box 215, the SCP 122 returns a routing response message indicating that the toll-free telephone subscriber subscribes to the billing service (e.g., as discussed above with respect to the 8XX access database), and returns an SS7 Analyze Route Message used in the routing of the telephone call to the switch and trunk group serving the SNIP 130 using the SS7 communications protocol. The SNIP then determines the first termination number corresponding to the toll-free telephone number at box 220, using logic (i.e. programming). This may be accomplished, for example, by the SNIP searching an internal database, such as the database within the storage device 148 of the SNIP. The storage device may include, for example, a list of toll-free telephone numbers with corresponding termination telephone numbers. In the alternative, the SNIP 130 may directly query the SCP 122 for the proper termination number corresponding to the first toll-free telephone number.

Upon determining the first termination telephone number, the SNIP 130 may send an SS7 IAM to a particular portion of the telephone network to initiate the call setup to the first termination telephone number, and routes the telephone call to the first termination (i.e. telephone network location 106) as shown at box 225. The SNIP waits for an SS7 Answer Message (ANM) message to indicate that the call has been answered. The VRU application bridges the initiating telephone number and the first termination telephone number together through the SNIP 130.

Upon answering the telephone call at the first termination 106, the SNIP 130 initiates the first call record for the first toll-free telephone number at box 230. The first call record may include, for example, information regarding the calling party initiating telephone number, the first toll-free telephone number, the first termination telephone number, and the connection time between the initiating telephone number and the first terminating telephone number. The SNIP has capabilities for monitoring (i.e. listening-in) to the toll-free telephone call and determining how long the connection lasts (i.e. timing the telephone connection). The first termination telephone number may be the telephone network location 106 corresponding to a company switchboard, a company PBX, or an Interactive Voice Response Unit (IVRU) at the terminating telephone number. In an alternative embodiment, the first termination may instead be a VRU 134 of the SNIP 130, where the toll-free subscriber subscribes to a VRU service. In this case, the SNIP has capabilities for searching a database for other telephone service subscriptions corresponding to the toll-free telephone number, and determining that calls to the first toll-free telephone number are to be forwarded to the VRU 134 of the SNIP 130, as the first termination telephone number. Such a database may be maintained, for example, within the storage device 148 of the SNIP 130.

The SNIP 130 then monitors the toll-free telephone call for an indication that the telephone call is to be transferred to, or conferenced with, a second toll-free telephone number, as shown at box 235. Such an indication may be provided by a DTMF signal entered during the telephone call, for example, by the calling party, or a party at the first termination network location 106. For example, various options may be presented by a VRU at the first termination telephone number, for example, dial "1" for human resources, dial "2" for customer service, etc., where the selection by the calling party initiates the transfer or conference. Where the telephone call was transferred to the VRU 134 of the SNIP 130, the indication may be provided by DTMF signal(s) provided in a similar fashion by the calling party responding to VRU 134 options. In the alternative, the signal indicating a transfer to or conference with a second toll-free telephone number may be provided, for example, by call-forwarding capabilities that may be provided at the SNIP 130.

It is then determined at the SNIP 130 whether a transfer to a second toll-free telephone number is indicated at box 240. Where a transfer is indicated at box 240, the first call record for the first toll-free telephone number is closed at box 245. The SNIP 130, for example, via the switch 132, possesses capabilities for maintaining the telephone call in a suspended state, and determining a second termination telephone number corresponding to the second toll-free telephone number at box 250, to which the calling party is connected. For example, after determining the second termination telephone number, the SNIP sends an SS7 IAM to the portion of the telephone network servicing the second termination telephone number to initiate the call setup to the second termination, and waits for an SS7 ANM message. The connection with the first termination is then dropped by the SNIP 130. The second termination telephone number may be determined in a similar fashion as the determination of the first termination telephone number discussed above with respect to box 220. Alternatively, if the second toll free number is administered by a secondary carrier, the termination point may be determined as described above.

Once an SS7 ANM message is received, the SNIP bridges the initiating and second termination telephone numbers. Upon answering of the telephone call at the second termination telephone number, a second call record is initiated by the SNIP 130 at box 255. The second call record may include, for example, information regarding the calling party initiating telephone number, the second toll-free telephone number, the second termination telephone number (which would be the LEC tandem if the call terminates with another carrier), and the connection time between the initiating telephone number and the second terminating telephone number. The SNIP 130 has capabilities for monitoring (i.e. listening-in) to the toll-free telephone call transferred to the second toll-free telephone number, and determining how long the connection lasts (i.e. timing the telephone connection). Similar to as discussed above with respect to box 230, the second termination telephone number may be the network location 108 corresponding to a company switchboard, a company PBX, or an Interactive Voice Response Unit (IVRU) at the second terminating telephone number. In an alternative embodiment, the second termination may instead be a VRU 134 of the SNIP 130. The second call record may then be closed at box 260 upon completion of the telephone call between the initiating telephone number and the second termination telephone number. At box 280, if it is determined that the second toll free number is unrecognized, then the second record is discarded.

Where it is indicated that a conference is desired at box 240, flow continues to box 265, where the second termination telephone corresponding to the second toll-free telephone number is determined. The SNIP 130, for example, via the switch 132, possesses capabilities for maintaining the telephone call in a suspended state, and for determining the second termination telephone number corresponding to the second toll-free telephone number. This may be accomplished in a similar fashion as determining the first termination telephone number discussed above with respect to box 220. For example, after determining the second termination telephone number, the SNIP sends an SS7 IAM to the portion of the telephone network servicing the second termination telephone number to initiate the call setup to the second termination, and waits for an SS7 ANM message. Once an SS7 ANM message is received, the SNIP bridges the initiating, the first, and the second termination telephone numbers.

As shown at box 270, the second call record is initiated. The initiating the second call record of box 270 may be accomplished in a similar fashion as discussed above with respect to box 255. As shown at box 275, the first and second call records may be closed upon termination of the conference call between the initiating telephone number and the first and second termination telephone numbers. At box 280, if it is determined that the second toll free number is unrecognized, then the second record is discarded.

Figure 3:
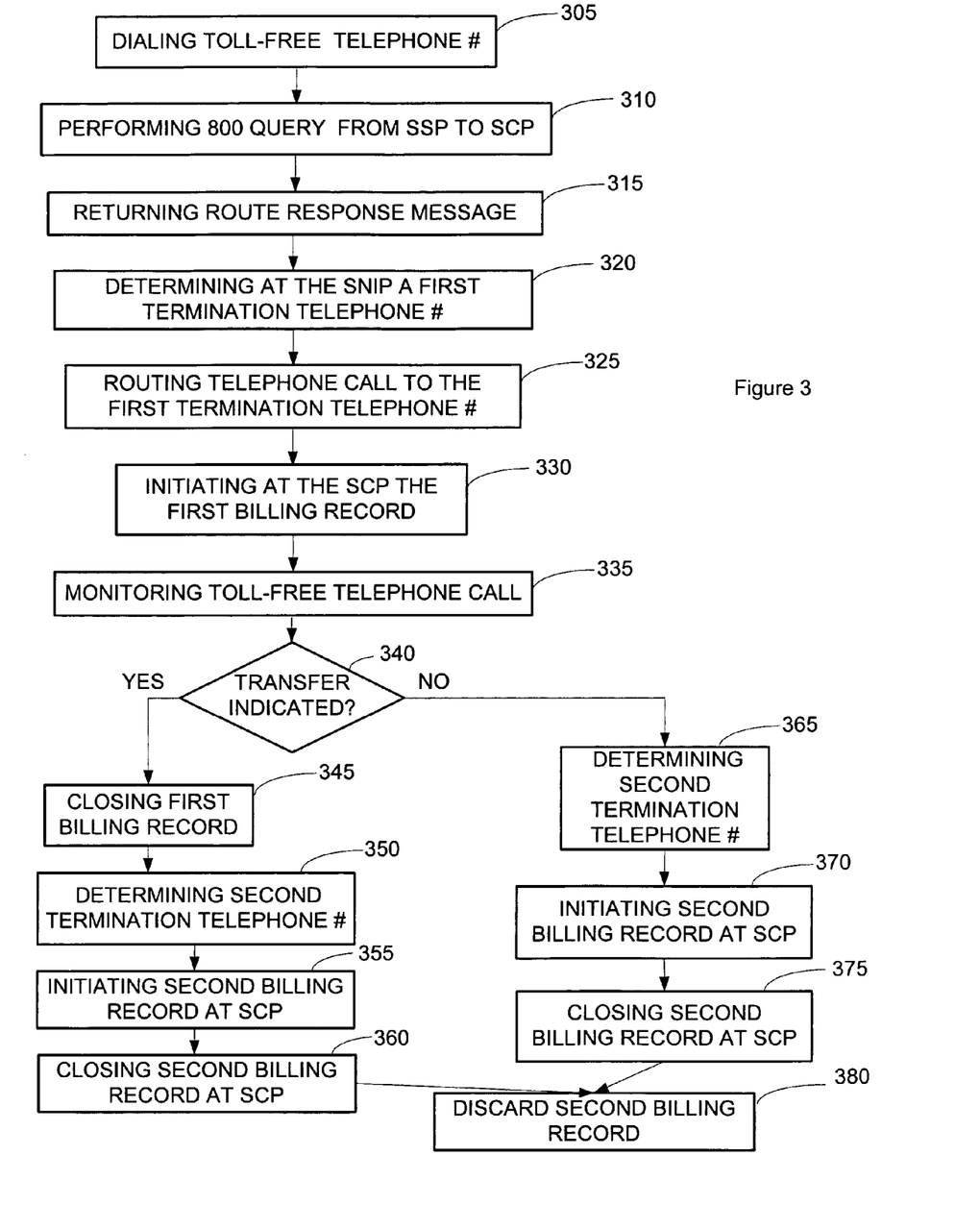
FIG. 3 is a flowchart illustrating operation of the telephone network of FIG. 1 in providing toll-free telephone call billing, where call records are generated by a Service Control Point, in accordance with another embodiment of the invention.

FIG. 3 is a flow chart illustrating operation of the telephone network of FIG. 1 in billing a toll-free telephone call, in accordance with an embodiment of the invention. The flowchart of FIG. 3 will be discussed in relation to the telephone network 100 of FIG. 1, where the SNIP 130 uses capabilities at the SCP 122 for generating call records for billing.

As shown at box 305, a calling party 104 dials a first toll-free telephone number. At box 310, the SSP 110 performs an 800 query with the SCP 122, using for example, the SS7 communications protocol. At box 315, the SCP 122 returns a routing response message indicating that the toll-free telephone subscriber subscribes to the billing service (e.g., as discussed above with respect to the 8XX access database), and returns an SS7 Analyze Route Message used in the routing of the telephone call to the switch and trunk group serving the SNIP 130 using the SS7 communications protocol. The SNIP then determines the first termination number corresponding to the toll-free telephone number at box 320. This may be accomplished, for example, by the SNIP 130 searching an internal database, such as the database within the storage device 148 of the SNIP. The storage device may include, for example, a list of toll-free telephone numbers with corresponding termination telephone numbers. In the alternative, the SNIP 130 may directly query the SCP 122 for the proper termination number corresponding to the first toll-free telephone number.

Upon determining the first termination telephone number, the SNIP 130 sends an SS7 IAM to a particular portion of the telephone network to initiate the call setup to the first termination telephone number, and routes the telephone call to the first termination (i.e. telephone network location 106) as shown at box 325. The SNIP waits for an SS7 Answer Message (ANM) message to indicate that the call has been answered. The VRU application bridges the initiating telephone number and the first termination telephone number together through the SNIP 130. When the SS7 ANM message is received, the SNIP 130 indicates to the SCP that the call is answered, and the SCP initiates the first call record for the first toll-free telephone number at box 330. Communications between the SNIP and the SCP may take the form of, for example, Intelligent Network Application Protocol (INAP) messages. The first call record may include, for example, information provided from the SNIP 130 such as the calling party initiating telephone number, the first toll-free telephone number, the first termination telephone number, and the connection time between the initiating telephone number and the first terminating telephone number. The SNIP has capabilities for monitoring (i.e. listening-in) to the toll-free telephone call and determining how long the connection lasts (i.e. timing the telephone connection). Alternatively, the SCP 122 may have capabilities for monitoring (timing) how long the connection between the initiating telephone number and the first terminating telephone number by receiving an indication from the SNIP 130 that the connection with the first termination telephone number has been terminated. As discussed above, the first termination telephone number may be the telephone network location 106 corresponding to a company switchboard, a company PBX, or an Interactive Voice Response Unit (IVRU) at the terminating telephone number. Alternatively, the first termination may instead be a VRU 134 of the SNIP 130, where the toll-free subscriber subscribes to a VRU service.

The SNIP 130 then monitors the toll-free telephone call for an indication that the telephone call is to be transferred to, or conferenced with, a second toll-free telephone number, as shown at box 335. Such an indication may be provided by a DTMF signal entered during the telephone call, for example, by the calling party, or a party at the first termination network location 106. For example, various options may be presented by a VRU at the first termination telephone number, for example, dial "1" for human resources, dial "2" for customer service, etc., where the selection by the calling party initiates the transfer or conference. Where the telephone call was transferred to the VRU 134 of the SNIP 130, the indication may be provided by DTMF signal(s) provided in a similar fashion by the calling party responding to VRU 134 options. In the alternative, the signal indicating a transfer to or conference with a second toll-free telephone number may be provided, for example, by call-forwarding capabilities that may be provided at the SNIP 130.

It is then determined at the SNIP 130 whether a transfer to a second toll-free telephone number is indicated at box 340. Where a transfer is indicated at box 340, the SNIP indicates an intent to transfer to the SCP 122, and the SCP 122 closes the first call record for the first toll-free telephone number at box 345. The SNIP 130, for example, via the switch 132, possesses capabilities for maintaining the telephone call in a suspended state, and determining a second termination telephone number corresponding to the second toll-free telephone number at box 350, to which the calling party is connected. For example, after determining the second termination telephone number (which would be the LEC tandem if the call terminates with another carrier), the SNIP sends an SS7 IAM to the portion of the telephone network servicing the second termination telephone number to initiate the call setup to the second termination, and waits for an SS7 ANM message. Upon receiving the SS7 ANM message, the connection with the first termination telephone number is dropped, and the initiating and second termination telephone numbers are bridged through the SNIP 130. The second termination telephone number may be determined in a similar fashion as the determination of the first termination telephone number discussed above with respect to box 320. Alternatively, if the second toll free number is administered by a secondary carrier, the termination point may be determined as described above.

Upon answering of the telephone call at the second termination telephone number, the SNIP indicates the transfer was answered to the SCP 122, and a second call record is initiated by the SCP 122 at box 355. The second call record may include, for example, information regarding the calling party initiating telephone number, the second toll-free telephone number, the second termination telephone number (which would be the LEC tandem if the call terminates with another carrier), and the connection time between the initiating telephone number and the second terminating telephone number. The SNIP 130 has capabilities for monitoring (i.e. listening-in) to the toll-free telephone call transferred to the second toll-free telephone number, and determining how long the connection lasts (i.e. timing the telephone connection). Similar to as discussed above with respect to box 330, the second termination telephone number may be the network location 108 corresponding to a company switchboard, a company PBX, or an Interactive Voice Response Unit (IVRU) at the second terminating telephone number. In an alternative embodiment, the second termination may instead be a VRU 134 of the SNIP 130. The second call record may then be closed by the SCP 122 at box 360, upon an indication from the SNIP 130 that the telephone call between the initiating telephone number and the second termination telephone number has been completed. At box 380, if it is determined that the second toll free number is unrecognized, then the second record is discarded.

Where it is indicated that a conference is desired at box 340, flow continues to box 365, where the second termination telephone corresponding to the second toll-free telephone number is determined. The SNIP 130, for example, via the switch 132, possesses capabilities for maintaining the telephone call in a suspended state, and for determining a second termination telephone number corresponding to the second toll-free telephone number at box 350, in a similar fashion as discussed above with respect to box 320. For example, after determining the second termination telephone number, the SNIP sends an SS7 IAM to the portion of the telephone network servicing the second termination telephone number to initiate the call setup to the second termination, and waits for an SS7 ANM message. Upon receiving the SS7 ANM message, the connection between the initiating, first and second termination telephone numbers is bridged through the SNIP 130.

As shown at box 370, the second call record is initiated by the SCP. The initiating of the second call record of box 370 may be accomplished by the SCP 122 in a similar fashion as discussed above with respect to box 355. As shown at box 375, the SCP 122 may close the first and second call records upon an indication from the SNIP 130 that the conference call between the initiating telephone number and the first and second termination telephone numbers has been completed. At box 280, if it is determined that the second toll free number is unrecognized, then the second record is discarded.

Although only first and second call records are shown as being generated with respect to the Flowcharts of FIGS. 2 and 3, it will be appreciated that any number of call records may be generated, where the SNIP 130 may remain in the call loop and detect additional indications to transfer or conference the toll-free telephone call between the calling party and second termination. Such additional call records may be generated by the SNIP 130 or the SCP 122, in a similar fashion as discussed above with respect to boxes 240-275 and boxes 340-375, respectively.

Figure 4:
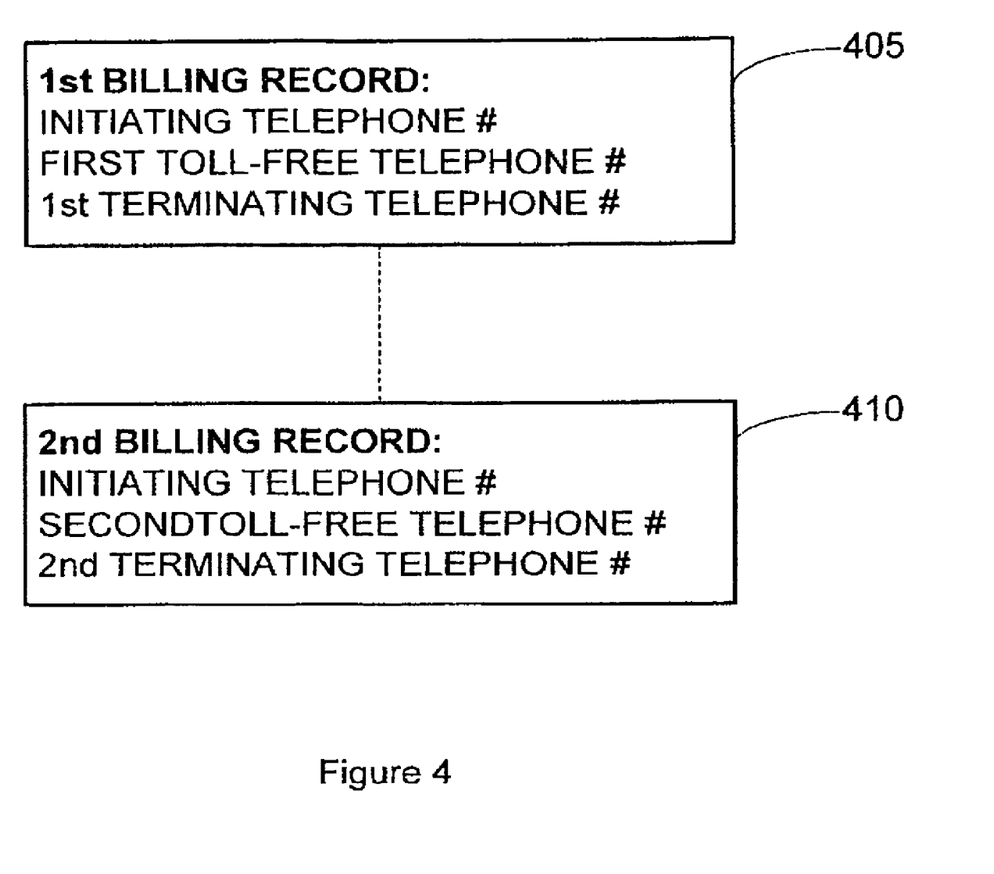
FIG. 4 illustrates exemplary, simplified call records that may be generated where a call is transferred to or conferenced with a second toll-free telephone number, in accordance with an embodiment of the invention.

FIG. 4 illustrates exemplary, simplified call records that may be generated where a call is transferred to, or conferenced with, a second toll-free telephone number, in accordance with an embodiment of the invention. The call records shown in FIG. 4 may be generated, for example, by the SNIP 130 in accordance with Flowchart 2, and may be generated by the SCP 122, in accordance with the Flowchart of FIG. 3.

As shown in FIG. 4, a first call record represented at 405 may include information such as an initiating telephone number, a first toll-free telephone number, and a first terminating telephone number. Further, and not shown, the first call record 405 may include, but is not limited to, information such as a the connection time between the initiating telephone number and the first terminating telephone number, feature identifiers (i.e., that occurred during call processing logic such as announcements, activation of authorization codes, etc. . . . ), call start time, call stop time, payphone indicators, international indicators, etc. . . .

A second call record represented at 410 may include information such as an initiating telephone number, a second toll-free telephone number, and a second terminating telephone number (which would be the LEC tandem if the call terminates with another carrier). Further, and not shown, the second call record 410 may include, but is not limited to, information such as a connection time between the initiating telephone number and the second terminating telephone number, feature identifiers (i.e., that occurred during call processing logic such as announcements, activation of authorization codes, etc. . . . ), call start time, call stop time, payphone indicators, international indicators, etc. . . .

As discussed above, the first call record is initiated when a call to the toll-free number is answered at the first terminating location. The first call record is closed when a transfer to another toll-free telephone number is initiated, or when a conferenced call between the initiating telephone number and the first and second termination telephone numbers is terminated.

The second call record is initiated when the transferred or conferenced call is answered at the second termination. The second call record may be closed when the transferred or conferenced call is either terminated, or the call is transferred to yet another toll-free telephone number.

If the second toll-free number is unrecognized, as when the call terminates with a secondary carrier, the second record is discarded so that only a portion of the call that was connected from the caller to the termination point over the primary carrier's network is billed by the primary carrier. Moreover, access to the service can be limited to subscribers of the service.

Although only two call records are shown in FIG. 4, one skilled will appreciate that any number of call records may be generated by the SNIP 130 and/or SCP 122 in the fashion discussed above.

The billing information for the first and second call records discussed above may be stored as one or more database files at the storage device 148 of the SNIP 130. For example, the call record information for the first call record may be stored in the storage device 148 as a database file and include information for database fields including, but not limited to, initiating telephone number, toll-free telephone number, terminating telephone number, length of time of the connection between the initiating telephone number and the terminating telephone number. The database fields of the database file for the first call record may be populated with the initiating (calling party) telephone number, the first toll-free telephone number, the first terminating party telephone number, and the length of the connection between the initiating telephone number and the first terminating telephone number, respectively. It will be appreciated that additional information may be maintained within the billing database records.

Similarly, the call record information for the second call record generated during the telephone call where the call is transferred to, or conferenced with, a second toll-free telephone number may be stored in the storage device 148 using the same database fields. The database fields for the second call record may by populated with the initiating (calling party) telephone number, the second toll-free telephone number, the second terminating party telephone number, and the length of the connection between the initiating telephone number and the second terminating telephone number, respectively. It will be appreciated that additional information may be maintained within the billing database records. Additional call records from further transfers to, or conferences with, additional toll-free numbers, may also be generated.

Generating of the multiple call records during the call may be accomplished while the call is occurring, as discussed above with the Flowcharts of FIGS. 2 and 3. In the alternative, the information used in the generation of the call records may be maintained until after all transfers and/or conferences of the initiating telephone number with toll-free telephone numbers are terminated, at which time, the SNIP or the SCP 122 may use the retained information including length of time of each connection, to generate the call records for each toll-free telephone number involved in the telephone call initiated by the calling party. The call records may be uploaded to the billing server 124 just after creation. In the alternative, the call records generated at the SNIP and/or SCP may be stored at the storage device 148, and uploaded at predetermined times, for example once, twice, or any other number of preset times during a particular day. Where the SCP generates the call records, the records may be stored at a storage device located at the SCP (not shown). Similarly, the call records may be uploaded to the billing server 124 in real-time or near real-time, or may be uploaded at predetermined times during the day.

As would be appreciated by one skilled in the art, the call records information may be maintained in various database fields of a database file stored at the memory device 148, or in multiple database fields of the database.

When the SNIP 130 generates the call records, the application engine 140 is programmed to retain the billing information, and to generate corresponding call records for each toll-free telephone number involved in the telephone call. The second record is discarded when the call terminates in a secondary carrier network. The application engine 140 is further programmed to store the call record information in the appropriate field of one or more database files maintained at the storage device 148.

The various database file formats for the call records discussed above are exemplary, and one skilled in the art would realize that any number of database entries may be provided for each of the respective database files. Further, although multiple database files are described, one skilled will appreciate that the information stored in the various databases may be maintained in a single database file, or any other number of database files, so long as the application engine 140 is programmed with information regarding from which database(s) to retrieve the various information stored. Further, although the information is described as being stored in the form of one or more database files at the memory device 148, one skilled will realize that the information may be stored in other formats, so long as the application engine 140 is sufficiently programmed for retrieving the data.

Although the system of FIG. 1 is shown with a connection between the SCP 122, the SNIP 130, and the Billing Server 124, it will be appreciated that other configurations may be possible. For example, where the SNIP 130 has capabilities for generating call records, the SNP 130 need not be coupled with the SCP 122, and the SCP 122 need not be coupled with the Billing Server 124.

For example, where AIN services are not present in a particular portion of the telephone network, one or more telephone switches within the telephone network may be programmed to route the toll-free telephone calls to the SNIP 130. The SNIP 130 then determines the terminating number for the toll-free telephone number, and routes the call in a similar fashion as described above, looping the toll-free call through the SNIP. The SNIP 130 may then generate one or more call records for the call as described above. It will be apparent, that although the SNIP 130 has been described as being a separate network entity, the functionality described with respect to the SNIP may be incorporated in other telephone network components, for example, an SCP, or SSP, of the telephone network, while achieving the advantages discussed herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for public telephone networks (e.g., AIN) represents an example of the state of the art. Such standards are periodically superseded by faster or more efficient equivalents having essentially the same functions. Accordingly, replacement standards and protocols having the same functions are considered equivalents.

What is claimed is:

1. A method for billing a telephone call that originates in a primary telecommunications carrier network and terminates in a secondary telecommunications carrier network, comprising:

generating multiple billing records in response to the telephone call, at least one billing record comprising a toll free number administered by the secondary carrier;

determining whether the toll free number is administered by the secondary carrier; and discarding the billing record including the toll free number administered by the secondary carrier when it is determined that the toll free number is administered by the secondary carrier;

wherein the primary carrier only bills for a portion of the call that was connected from the caller to the termination point of the primary carrier network.

2. The method of claim 1, further comprising determining whether the telephone call is eligible to be connected to the secondary carrier.

3. The method of claim 2, further comprising, when the call is eligible to be connected to the secondary network, routing the call to a LEC tandem that then routes the call to a final destination.

4. The method of claim 1, in which the determining further comprises checking a list of toll free numbers administered by the primary carrier, the list being stored in a service control point; and
when the toll free number in the billing record is not in the list, determining that the toll free number in the billing record is not administered by the primary carrier.

5. The method of claim 1, in which the billing record further comprises a terminating point and a call duration.

6. The method of claim 1, in which the call is transferred to the second toll free number via a call transfer service.

7. A computer readable medium storing a program for billing a telephone call that originates in a primary telecommunications carrier network and terminates in a secondary telecommunications carrier network, comprising:
a generating code segment that generates multiple billing records in response to the telephone call, at least one billing record comprising a toll free number administered by the secondary carrier;
a determining code segment that determines whether the toll free number is administered by the secondary carrier; and
a discarding code segment that discards the billing record including the toll free number administered by the secondary carrier when it is determined that the toll free number is administered by the secondary carrier;
wherein the primary carrier only bills for a portion of the call that was connected from the caller to the termination point of the primary carrier network.

8. The medium of claim 7, further comprising a second determining code segment that determines whether the telephone call is eligible to be connected to the secondary carrier.

9. The medium of claim 8, further comprising a routing code segment that routes the call to a LEC tandem that then routes the call to a final destination when the call is eligible to be connected to the secondary network.

10. The medium of claim 7, in which the determining code segment further comprises checking a list of toll free numbers administered by the primary carrier, the list being stored in a service control point; and
when the toll free number in the billing record is not in the list, determining that the toll free number in the billing record is not administered by the primary carrier.

11. The medium of claim 7, in which the billing record further comprises a terminating point and a call duration.

12. The medium of claim 7, in which the call is transferred to the second toll free number by a call transfer service.

13. An apparatus for billing a telephone call that originates in a primary telecommunications carrier network and terminates in a secondary telecommunications carrier network, comprising:
a service control point (SCP) that generates multiple billing records in response to the telephone call, at least one billing record comprising a toll free number administered by the secondary carrier, the SCP determining whether the toll free number is administered by the secondary carrier; and discarding the billing record including the toll free number administered by the secondary carrier when it is determined that the toll free number is administered by the secondary carrier;
wherein the primary carrier only bills for a portion of the call that was connected from the caller to the termination point of the primary carrier network.

14. The apparatus of claim 13, in which the SCP further determines whether the telephone call is eligible to be connected to the secondary carrier.

15. The apparatus of claim 13, in which the SCP checks a list of toll free numbers administered by the primary carrier, the list being stored in the service control point, to determine whether the toll free number in the billing record is administered by the primary carrier.

16. The apparatus of claim 13, in which the billing record further comprises a terminating point and a call duration.

17. The apparatus of claim 13, in which the call is transferred to the second toll free number by a call transfer service.

18. An system for billing a telephone call that originates in a primary telecommunications carrier network and terminates in a secondary telecommunications carrier network, comprising:
a service node/intelligent peripheral (SNIP) that generates multiple billing records in response to the telephone call, at least one billing record comprising a toll free number administered by the secondary carrier; and
a service control point (SCP) that receives the billing records from the SNIP, the SCP determining whether the toll free number is administered by the secondary carrier; and discarding the billing record including the toll free number administered by the secondary carrier when it is determined that the toll free number is administered by the secondary carrier;
wherein the primary carrier only bills for a portion of the call that was connected from the caller to the termination point of the primary carrier network.

19. The system of claim 18, in which the SCP further determines whether the telephone call is eligible to be connected to the secondary carrier.

20. The system of claim 18, in which the SCP checks a list of toll free numbers administered by the primary carrier, the list being stored in the service control point, to determine whether the toll free number in the billing record is administered by the primary carrier.

21. The system of claim 18, in which the call is transferred to the second toll free number by a call transfer service.

* * * * *